(12) United States Patent
Seong et al.

(10) Patent No.: US 7,928,987 B2
(45) Date of Patent: Apr. 19, 2011

(54) METHOD AND APPARATUS FOR DECODING VIDEO DATA

(75) Inventors: Nak-Hee Seong, Gwacheon-si (KR); Jae-Hong Park, Seongnam-si (KR); Young-Jun Kwon, Seongnam-si (KR); Tae-Sun Kim, Yongin-si (KR); Seon-Young Yeo, Seoul (KR); Sang-Hoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 927 days.

(21) Appl. No.: 11/606,482

(22) Filed: Nov. 30, 2006

(65) Prior Publication Data

US 2007/0165039 A1   Jul. 19, 2007

(30) Foreign Application Priority Data

Jan. 13, 2006   (KR) .................. 10-2006-0003958

(51) Int. Cl.
*G06F 13/00* (2006.01)
*G06T 1/60* (2006.01)

(52) U.S. Cl. ........................................ 345/536; 345/530

(58) Field of Classification Search .................. 345/533, 345/536
See application file for complete search history.

(56) References Cited

U.S. PATENT DOCUMENTS

| 5,276,515 | A | * | 1/1994 | Katsumata et al. | 348/704 |
| 5,666,322 | A | * | 9/1997 | Conkle | 365/230.03 |
| 6,335,728 | B1 | * | 1/2002 | Kida et al. | 345/204 |
| 6,842,864 | B1 | * | 1/2005 | Barth et al. | 713/401 |
| 6,871,001 | B1 | | 3/2005 | Okada | 386/6 |
| 7,106,380 | B2 | * | 9/2006 | Willis | 348/459 |
| 7,190,368 | B2 | * | 3/2007 | Linzer et al. | 345/536 |
| 2002/0109690 | A1 | * | 8/2002 | Champion et al. | 345/536 |
| 2004/0004672 | A1 | * | 1/2004 | Carlsgaard et al. | 348/448 |
| 2004/0100472 | A1 | | 5/2004 | Linzer et al. | |
| 2004/0234233 | A1 | * | 11/2004 | Jesuk | 386/13 |
| 2005/0091681 | A1 | | 4/2005 | Borden et al. | |
| 2005/0248595 | A1 | | 11/2005 | Tomizawa et al. | |

* cited by examiner

*Primary Examiner* — Kee M Tung
*Assistant Examiner* — Jacinta Crawford
(74) *Attorney, Agent, or Firm* — Monica H. Choi

(57) ABSTRACT

A video decoder organizes and stores pixel lines of a reference picture into first and second memory devices. The video decoder then reads portions of a pixel block from the first and second memory devices and processes such a pixel block for generating a subsequent picture. By reading from the first and second memory device with time overlap, latency is minimized for faster video decoding.

21 Claims, 9 Drawing Sheets

METHOD AND APPARATUS FOR DECODING VIDEO DATA

CROSS-REFERENCE TO RELATED APPLICATION(S)

The present application claims priority under 35 U.S.C. §119 to Korean Patent Application No. 10-2006-0003958, filed on Jan. 13, 2006, which is incorporated herein by reference in its entirety.

TECHNICAL FIELD

The present invention relates generally to video decoding, and more particularly, to minimizing latency in video decoding by using multiple memory devices for storing a reference picture.

BACKGROUND OF THE INVENTION

Referring to FIG. 1, a video decoder 102 generally generates pictures from compressed video data. In a particular decompression technique, the video decoder 102 generates a subsequent picture from a reference picture stored in a memory device 104. FIG. 2 illustrates such a reference picture 106 stored in the memory device 104. The reference picture 106 is comprised of multiple pixel lines of pixel data (each circled number in FIG. 2 represents data for one pixel of the reference picture). Each pixel line of the reference picture 106 may be for a raster scan line of a display device.

For generating the subsequent picture, the video decoder 102 reads and processes a block 108 of pixel data at a time. Because data in different pixel lines are typically stored with discontinuous addresses, the video decoder 102 issues multiple read requests for reading multiple pixel lines in the block 108 from the memory device 104.

FIG. 3 shows a time line for an example of such multiple read requests REQ_1 and REQ_2 that are for reading pixel data from a first pixel line (Line 1 in FIG. 2) and a second pixel line (Line 2 in FIG. 2) for the block 108. The first read request REQ_1 is issued by the video decoder 102 to the memory device 104 at a time point T1 for reading from the first pixel line. After a first latency LAT_1 from time point T1, the pixel data of the first pixel line for the block 108 is transferred from the memory device 104 to the video decoder 102 for a time period of READ_1 (i.e., T4-T3).

In addition, the second read request REQ_2 is issued by the video decoder 102 to the memory device 104 at a time point T2 for reading from the second pixel line, shortly after the time point T1. After a second latency LAT_2 from time point T2, the pixel data of the second pixel line for the block 108 is transferred from the memory device 104 to the video decoder 102 for a time period of READ_2 (i.e., T5-T4).

Referring to FIG. 3, READ_2 does not begin until after READ_1 is completed, resulting in extension of the second latency LAT_2 which in turn undesirably increases latency for video decoding. Thus, a mechanism is desired for minimizing such latency in video decoding.

SUMMARY OF THE INVENTION

Accordingly, in a general aspect of the present invention, multiple memory devices are used for storing pixel lines of a reference picture for minimizing latency in video decoding.

For decoding video data in a general aspect of the present invention, a video decoder stores a first set of pixel lines of a reference picture into a first memory device and stores a second set of pixel lines of the reference picture into a second memory device. The video decoder then reads a first portion of a pixel block from the first set of pixel lines in the first memory device and reads a second portion of the pixel block from the second set of pixel lines in the second memory device. The video decoder processes the pixel block for generating a subsequent picture.

In one embodiment of the present invention, the readings of the first and second portions of the pixel block overlap in time.

In another embodiment of the present invention, the video decoder generates a respective read request to the first or second memory devices for reading from each pixel line in the first or second memory devices.

In a further embodiment of the present invention, reading the first portion of the pixel block includes reading from a first sub-set of pixel lines of the first set, and reading the second portion of the pixel block includes reading from a second sub-set of pixel lines of the second set.

In an example embodiment of the present invention, a first number of pixel lines of the first set is substantially equal to a second number of pixel lines of the second set when the first and second memory devices operate with a substantially same clock frequency. Alternatively, the first number of pixel lines of the first set is different from the second number of pixel lines of the second set when the first and second memory devices operate with different clock frequencies. In that case, a ratio of the first number of pixel lines of the first set to the second number of pixel lines of the second set is proportional to a ratio of the first clock frequency of the first memory device to the second clock frequency of the second memory device.

In this manner, reading from multiple pixel lines of a reference picture may overlap in time by using multiple memory devices. Such overlap in time decreases latency for faster video decoding.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, 5, 6, 7, 8, 9, 10, 11, 12, and 13 refer to elements having similar structure and/or function.

DETAILED DESCRIPTION

Figure 4:
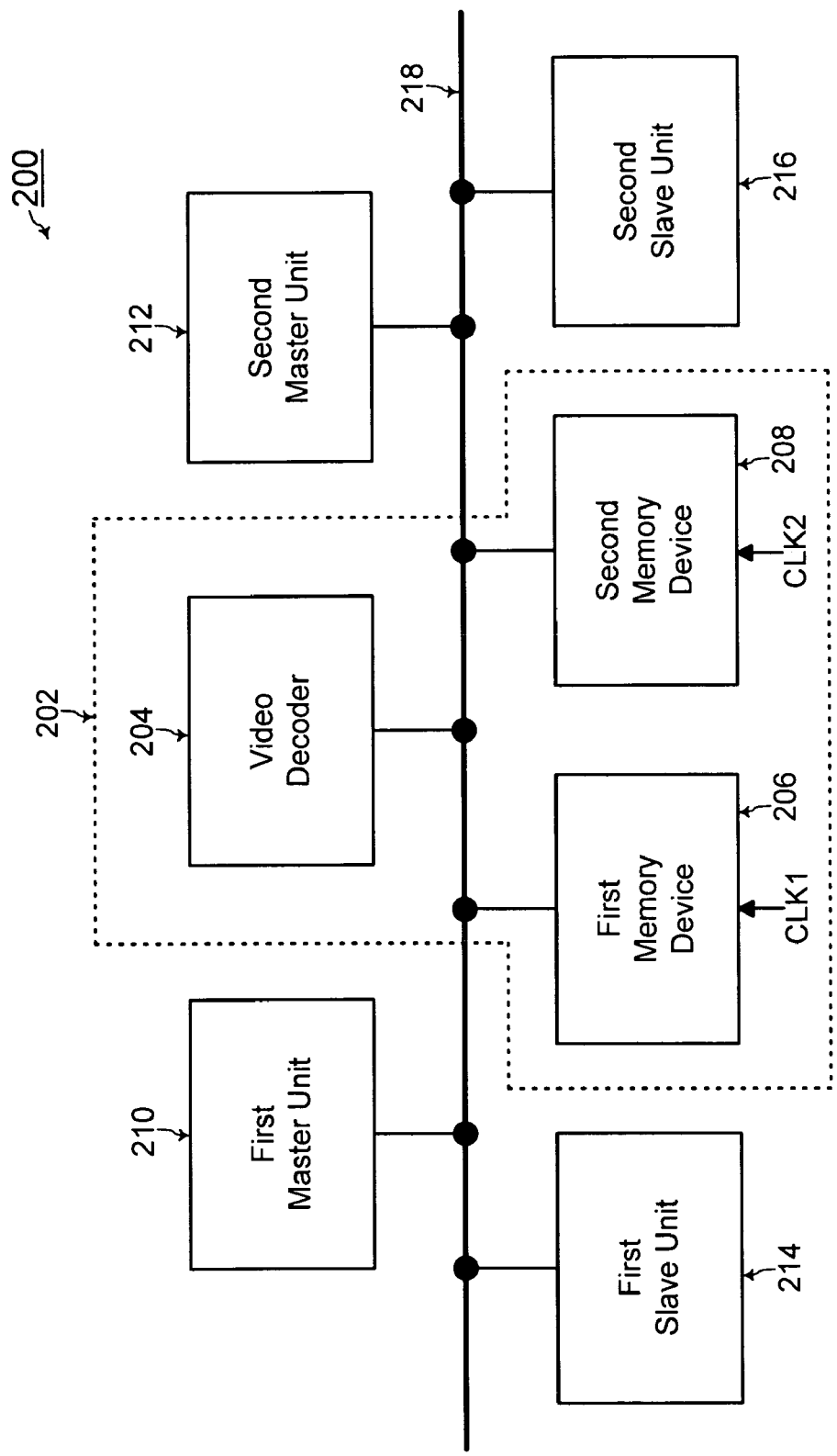
FIG. 4 shows a block diagram of a video decoding system having multiple memory devices for storing a reference picture, according to an embodiment of the present invention.

FIG. 4 shows a block diagram of a video decoding system 200 that processes video data to generate pictures. The system 200 includes an apparatus 202 for decoding video data by processing a reference picture to generate a subsequent picture. The apparatus 202 includes a video decoder 204 and multiple memory devices including a first memory device 206 and a second memory device 208. The first memory device 206 operates according to a first clock signal CLK1 having a first clock frequency $f_{CLK1}$, and the second memory device 208 operates according to a second clock signal CLK2 having a second clock frequency $f_{CLK2}$.

The system 200 also includes a first master unit 210, a second master unit 212, a first slave unit 214, and a second slave unit 216. Any of the master units 210 and 212 may be typical components of a video decoding system such as a main controller, a video/audio processor, a graphics processor, or a display engine for example. Any of the slave units 214 and 216 may be a bridge for a peripheral bus, a control register, or a memory controller for example. The components 204, 206, 208, 210, 212, 214, and 216 of FIG. 4 communicate via a system bus 218.

Figure 5:
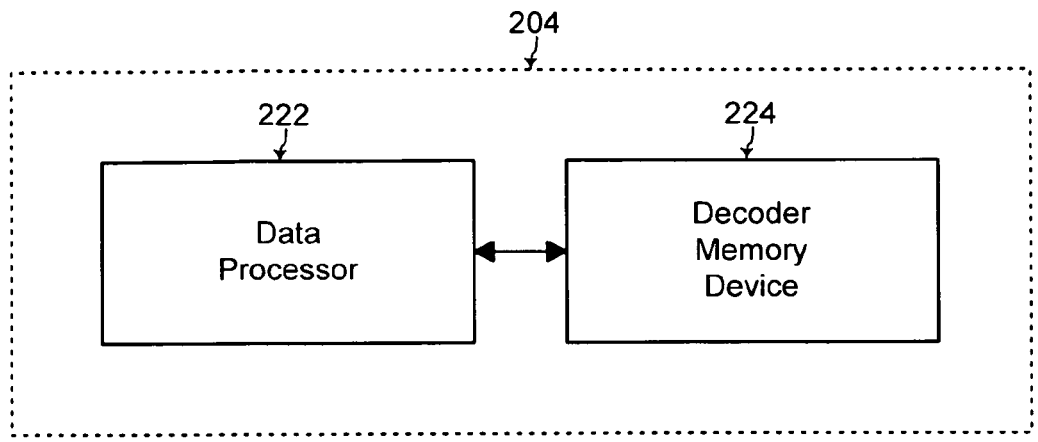
FIG. 5 shows a block diagram of a video decoder of FIG. 4, according to an embodiment of the present invention.

Referring to FIG. 5, the video decoder 204 is comprised of a data processor 222 and a decoder memory device 224. The decoder memory device 224 has sequences of instructions stored thereon, and execution of such sequences of instructions by the data processor 222 causes the data processor 222 to perform the steps of the flow-chart of FIG. 6. Operation of the video decoding apparatus 202 is now described in reference to the flow-chart of FIG. 6.

Figure 6:
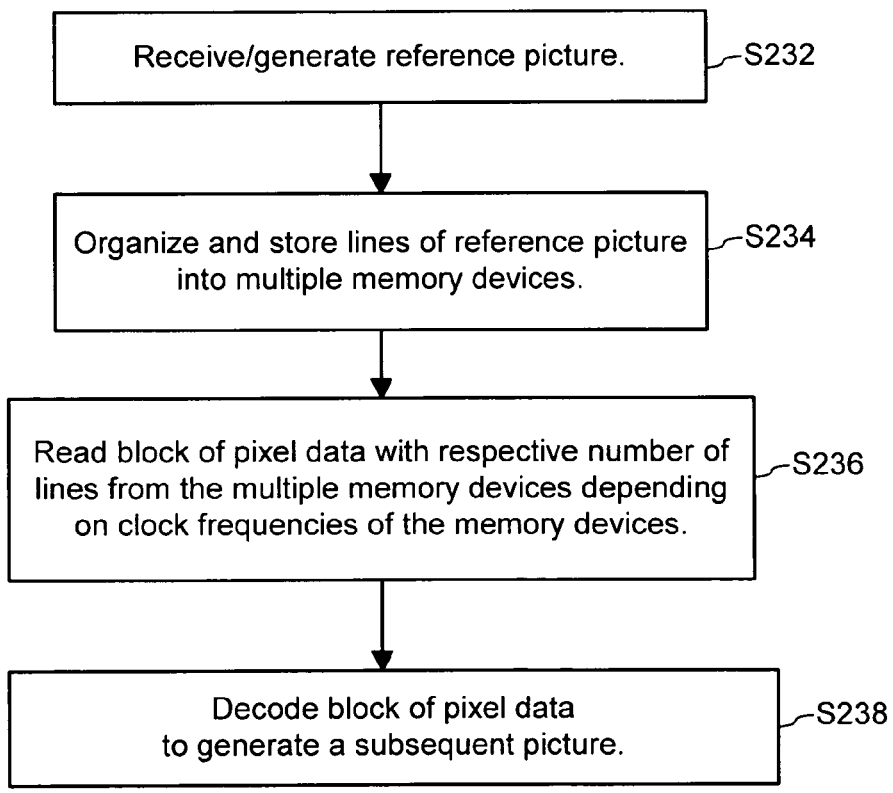
FIG. 6 shows a flow-chart of steps performed by the video decoder of FIG. 4, according to an embodiment of the present invention.
Figure 7:
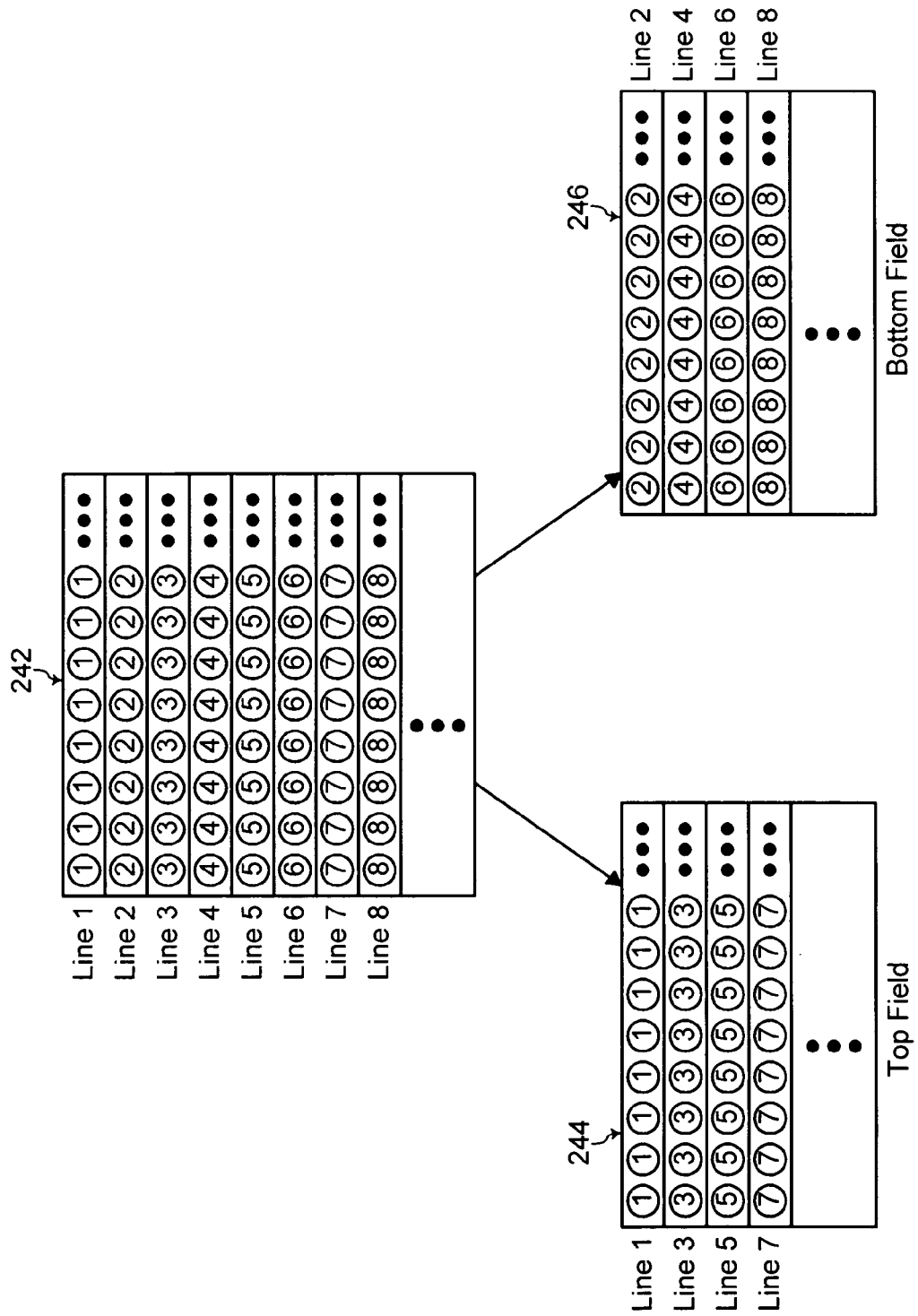
FIGS. 7, 8, and 9 illustrate organization of pixel lines of a reference picture for storage into first and second memory devices, according to an embodiment of the present invention.

Referring to FIGS. 5, 6, and 7, the data processor 222 of the video decoder 204 receives or generates a reference picture 242 (step S232 of FIG. 6). The reference picture 242 may be a prior picture generated by the video decoder 204 upon decoding a video data stream. Alternatively, the reference picture 242 may be received from one of the master units 210 or 212. In any case, the reference picture 242 is comprised of multiple pixel lines of pixel data (each circled number in FIG. 7 represents data for one pixel of the reference picture 242 with the number representing the line number for that pixel in the reference picture 242). Each pixel line of the reference picture 242 may be for a raster scan line of a display device.

Figure 8:
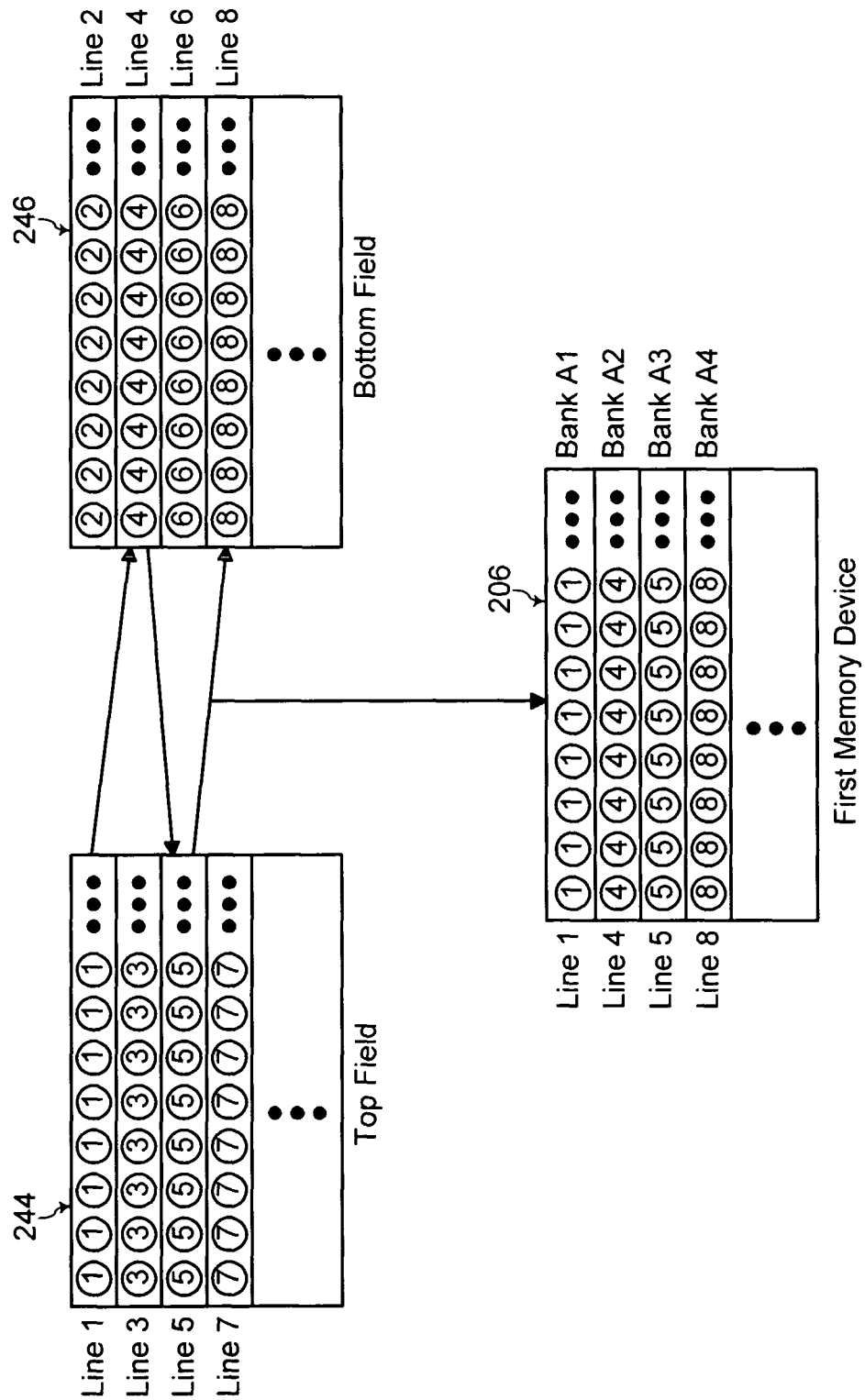
Figure 9:
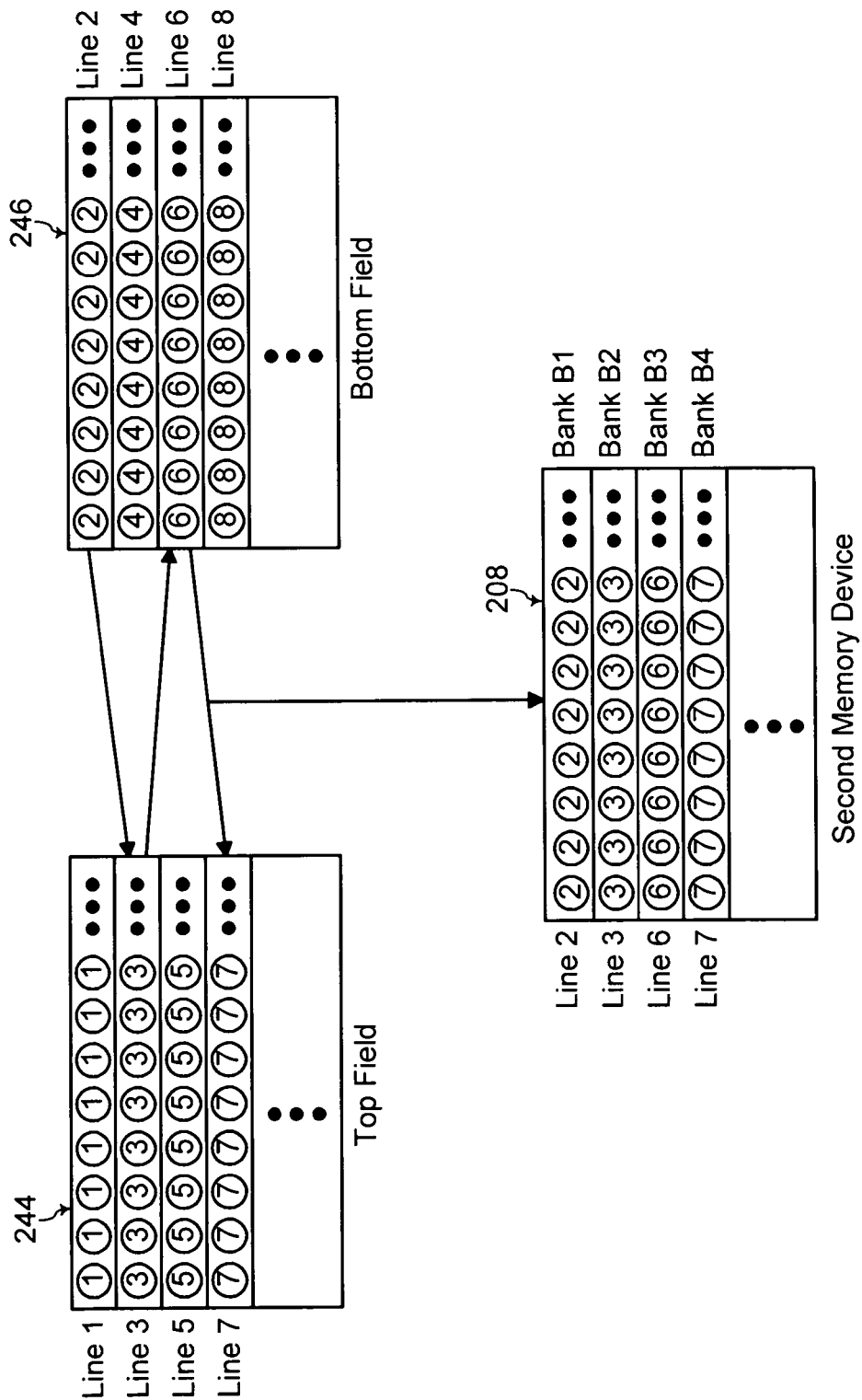

The data processor 222 of the video decoder 204 organizes and stores such pixel lines of the reference picture 242 into the multiple memory devices 206 and 208 (step S234 of FIG. 6). FIGS. 7, 8, and 9 illustrate one method for organizing the pixel lines of the reference picture 242 into the first and second memory devices 206 and 208. Referring to FIG. 7, the data processor 222 separates the odd and even pixel lines of the reference picture 242. The odd pixel lines are formed into a top field 244, and the even pixel lines are formed into a bottom field 246. Such top and bottom fields 244 and 246 may temporarily be stored in the decoder memory device 224.

Further referring to FIG. 8, odd pixel lines of the top field 244 are alternated with even pixel lines of the bottom field 246 (as illustrated by the arrow lines in FIG. 8) to form a first set of pixel lines of the reference picture 242 stored into the first memory device 206. Also referring to FIG. 9, odd pixel lines of the bottom field 246 are alternated with even pixel lines of the top field 244 (as illustrated by the arrow lines in FIG. 9) to form a second set of pixel lines of the reference picture 242 stored into the second memory device 208.

After such organization and storage of the pixel lines of the reference picture 242, the data processor 222 of the video decoder 204 reads a block of pixel data from the memory devices 206 and 208 (step S236 of FIG. 6) that is then processed to generate a subsequent picture (step S238 of FIG. 6). Such steps S236 and S238 are repeated for reading and processing each of multiple blocks of the reference picture 242 until a complete subsequent picture is generated.

Figure 10:
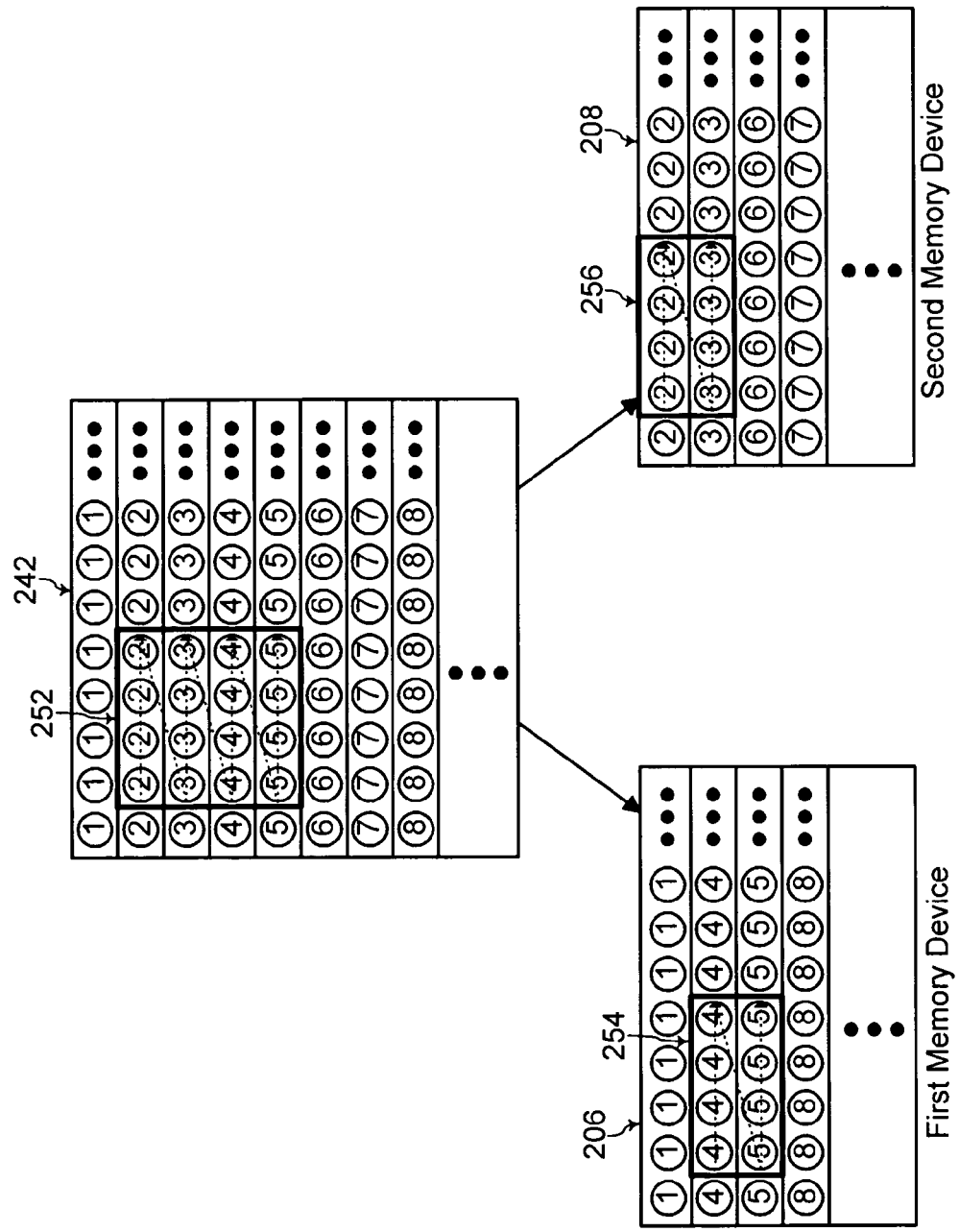
FIG. 10 illustrates reading of a block of pixel data from the first and second memory devices in a field mode, according to an embodiment of the present invention.

FIG. 10 illustrates such reading of an example block 252 of pixel data in the field mode. The video data stream received by the video decoding system 200 indicates that the video data stream is in one of a field mode or a frame mode. The video decoding system 200 then processes the video data in one of the indicated field or frame mode.

FIG. 10 illustrates an example 4×4 block 252 of pixel data to be read and processed in the field mode. In the prior art for the field mode, when one memory device stores the reference picture 242, the respective four pixels in the four relevant pixel lines of the block 252 are read in sequence, first from the second pixel line, then from the third pixel line, then from the fourth pixel line, and finally from the fifth pixel line (as illustrated by the dashed arrow lines within the block 252 in FIG. 10).

In contrast, with the two memory devices 206 and 208 in an embodiment of the present invention, a first 2×4 sub-block 254 is read from the first memory device 206, and a second 2×4 sub-block 256 is read from the second memory device 208. Thus, the first sub-block 254 includes pixel data of a first sub-set of pixel lines of the first set of pixel lines stored in the first memory device 206, and the second sub-block 256 includes pixel data of a second sub-set of pixel lines of the second set of pixel lines stored in the second memory device 208.

Further referring to FIG. 10, the respective four pixels in each of the two relevant pixel lines of the sub-block 254 are read in sequence, first from the second pixel line and then from the third pixel line of the first memory device 206 (as illustrated by the dashed arrow lines within the sub-block 254 in FIG. 10). Similarly, the respective four pixels in each of the two relevant pixel lines of the sub-block 256 are read in sequence, first from the first pixel line and then from the second pixel line of the second memory device 208 (as illustrated by the dashed arrow lines within the sub-block 256 in FIG. 10).

Figure 11:
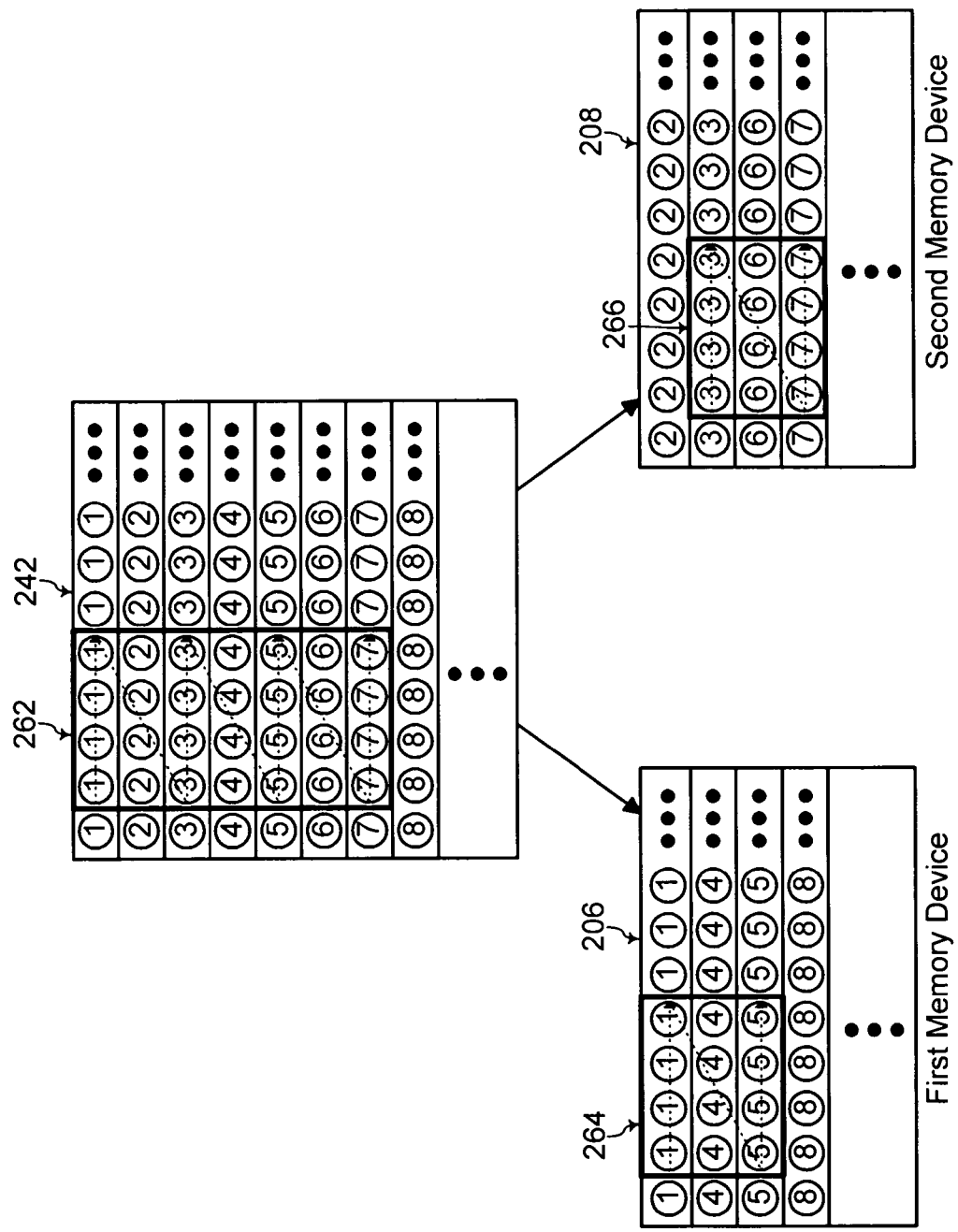
FIG. 11 illustrates reading of a block of pixel data from the first and second memory devices in a frame mode, according to an embodiment of the present invention.

FIG. 11 illustrates an example 4×4 block 262 of pixel data to be read and processed in the frame mode. In the prior art for the frame mode, when one memory device stores the reference picture 242, the respective four pixels in the four relevant pixel lines of the block 262 are read in sequence, first from the first pixel line, then from the third pixel line, then from the fifth pixel line, and finally from the seventh pixel line (as illustrated by the dashed arrow lines within the block 262 in FIG. 11).

In contrast, with the two memory devices 206 and 208 in an embodiment of the present invention, a first 2×4 sub-block 264 is read from the first memory device 206, and a second 2×4 sub-block 266 is read from the second memory device 208. Thus, the first sub-block 264 includes pixel data of a first sub-set of pixel lines of the first set of pixel lines stored in the first memory device 206, and the second sub-block 266 includes pixel data of a second sub-set of pixel lines of the second set of pixel lines stored in the second memory device 208.

Further referring to FIG. 11, the respective four pixels in each of the two relevant pixel lines of the sub-block 264 are read in sequence, first from the first pixel line and then from the third pixel line of the first memory device 206 (as illustrated by the dashed arrow lines within the sub-block 264 in FIG. 11). Similarly, the respective four pixels in each of the two relevant pixel lines of the sub-block 266 are read in sequence, first from the second pixel line and then from the fourth pixel line of the second memory device 208 (as illustrated by the dashed arrow lines within the sub-block 266 in FIG. 11).

In either case of the field mode of FIG. 10 or the frame mode of FIG. 11, reading from the first and second memory devices 206 and 208 overlaps in time for minimizing latency in video decoding. An example of such overlap in time is illustrated in FIG. 12 which is a time line of readings from the first and second memory devices 206 and 208.

Figure 12:
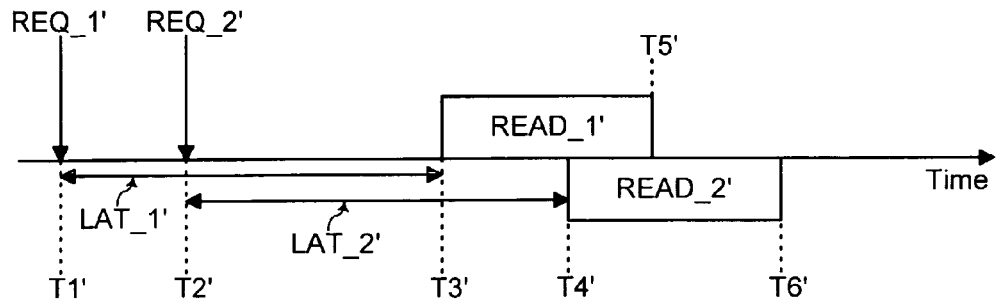
FIG. 12 shows a time line for reading from multiple pixel lines in the multiple memory devices of the video decoding system of FIG. 4, according to an embodiment of the present invention.

Referring to FIGS. 4 and 12, a first read request REQ_1' is issued by the video decoder 204 to the first memory device 206 at a time point T1' for reading pixel data from a pixel line stored within the first memory device 206. For example referring to FIG. 10, the video decoder 204 may issue the first read request REQ_1' for reading data for the four pixels in a pixel line for the first sub-block 254 within the first memory device 206. After a first latency LAT_1' from time point T1', such pixel data is transferred from the first memory device 206 to the video decoder 204 for a time period of READ_1' (i.e., T5'-T3' in FIG. 12).

In addition, a second read request REQ_2' is issued by the video decoder 204 to the second memory device 208 at a time point T2' for reading pixel data from a pixel line stored within the second memory device 208. For example referring to FIG. 10, the video decoder 204 may issue the second read request REQ_2' for reading data for the four pixels in a pixel line for the second sub-block 256 within the second memory device 208. After a second latency LAT_2' from time point T2', such pixel data is transferred from the second memory device 208 to the video decoder 204 for a time period of READ_2' (i.e., T6'-T4' in FIG. 12).

Figure 1:
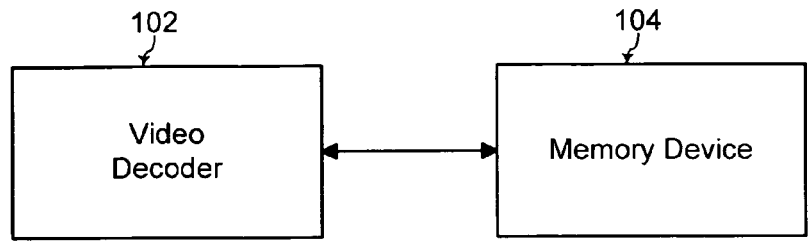
FIG. 1 shows an video decoding system having one memory device storing a reference picture, according to the prior art.
Figure 2:
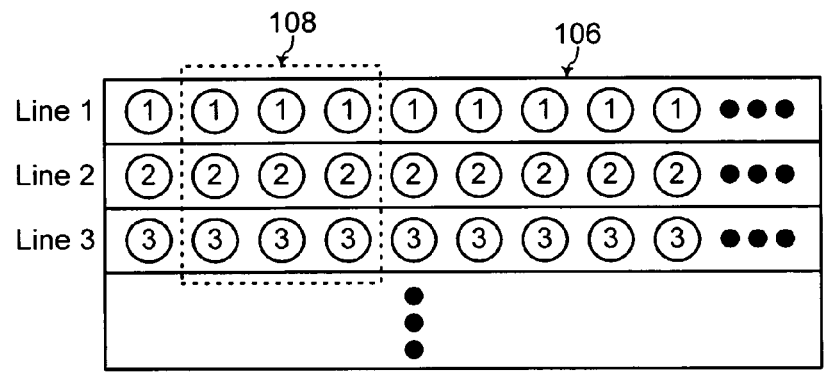
FIG. 2 shows multiple pixel lines of the reference picture stored in the memory device of FIG. 1, according to the prior art.
Figure 3:
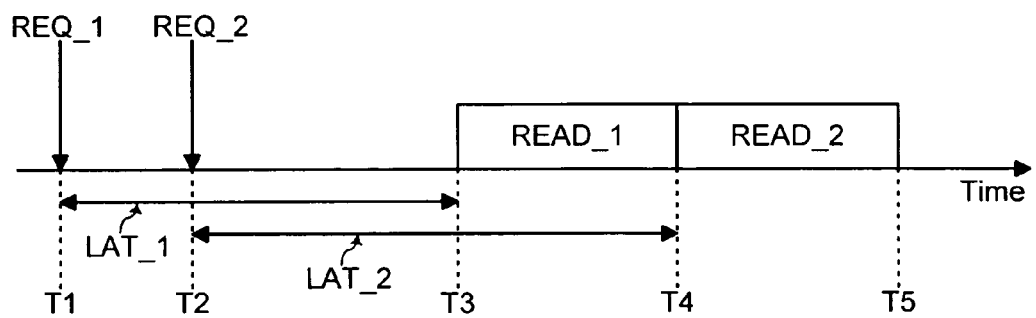
FIG. 3 shows a time line for reading from multiple pixel lines of the reference picture by the video decoder from the memory device in the system of FIG. 1, according to the prior art.

Further referring to FIG. 12, note that READ_1' and READ_2' overlap for a time period of T4'-T3'. Such overlap is possible because multiple memory devices 206 and 208 are used for storing the pixel lines of the reference picture 242. Reading from one memory device does not have to be completed before reading from another memory device, in contrast to the prior art. Comparing FIG. 3 of the prior art with FIG. 12 of an embodiment of the present invention, the second latency LAT_2' in FIG. 12 is shorter than the second latency LAT_2 in FIG. 3. Such shortened latency of the present invention is advantageous for faster video decoding.

Note that the example embodiments of FIGS. 7, 8, 9, 10, and 11 are illustrated for storing an equal number of pixel lines of the reference picture 242 into each of the first and second memory devices 206 and 208. In that case, the video decoder 204 reads an equal amount of pixel data from the first and second memory devices 206 and 208. Such an embodiment is advantageous for minimizing latency between reading from the multiple memory devices 206 and 208 operating with clock frequencies $f_{CLK1}$ and $f_{CLK2}$ that are substantially equal.

In an alternative embodiment of the present invention, the first and second memory devices 206 and 208 store different numbers of pixel lines of the reference picture 242 when the first and second memory devices 206 and 208 operate with different clock frequencies $f_{CLK1}$ and $f_{CLK2}$. In that case, the video decoder 204 reads unequal amounts of pixel data from the first and second memory devices 206 and 208. Assume that N1 is the number of pixel lines of the reference picture 242 stored in the first memory device 206, and that N2 is the number of pixel lines of the reference picture 242 stored in the second memory device 208.

For minimizing latency in reading from the first and second memory devices 206 and 208 when the first and second memory devices 206 and 208 operate with different clock frequencies $f_{CLK1}$ and $f_{CLK2}$, the following relationship is satisfied in an embodiment of the present invention:

$$N1/N2 = f_{CLK1}/f_{CLK2}$$

Thus, a memory device operating at a higher frequency proportionally stores more number of pixel lines of the reference picture 242. In addition, the video decoder 204 reads proportionally more pixel data from the memory device operating at the higher frequency.

Figure 13:
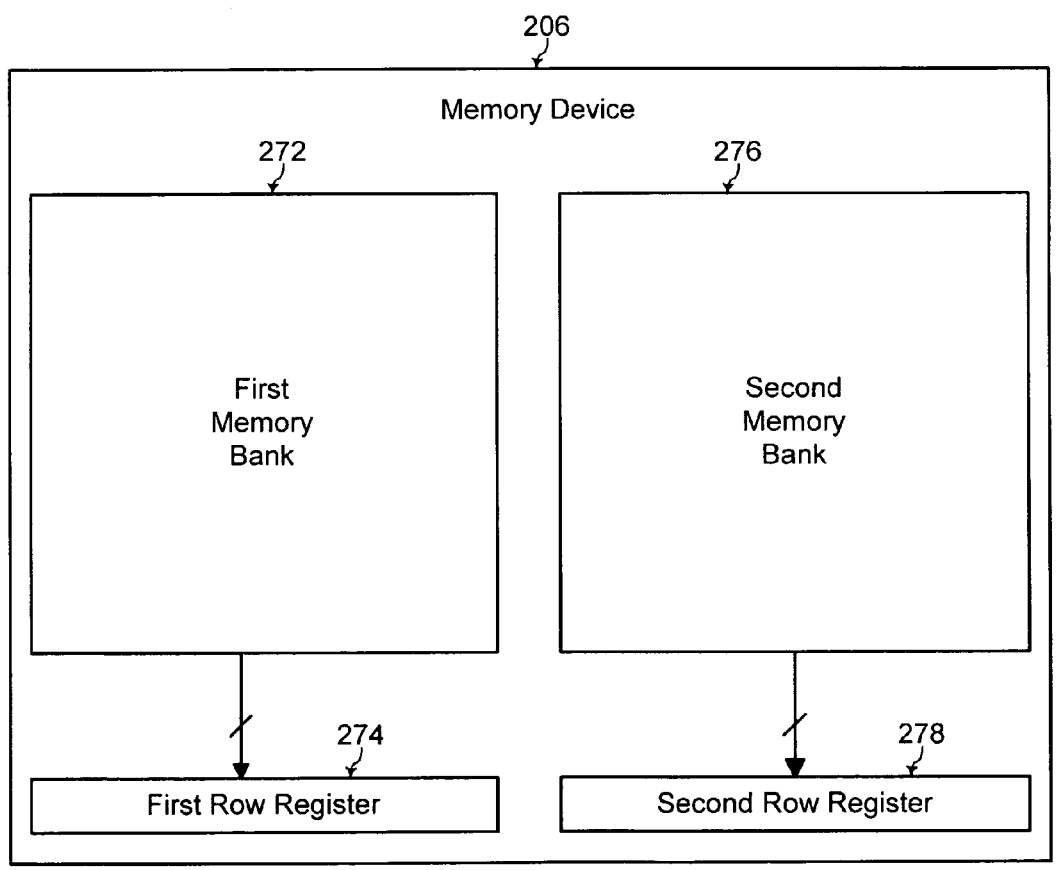
FIG. 13 illustrates a memory device having multiple memory banks for storing pixel lines of a reference picture, according to an embodiment of the present invention.

In a further embodiment of the present invention, latency may be further minimized when pixel lines of the reference picture 242 are stored into multiple memory banks within each of the memory devices 206 and 208. FIG. 13 illustrates the first memory device 206 as an example memory device having a first memory bank 272 and a second memory bank 276.

Each memory bank has a respective row register for outputting a pixel line of the reference picture 242 stored within that memory bank. Thus, a first row register 274 is for outputting a pixel line stored in the first memory bank 272, and a second row register 278 is for outputting a pixel line stored in the second memory bank 276. In that case, the video decoder 204 may read from multiple pixel lines of the reference picture 242 with time overlap from multiple banks of the first memory device 206. The second memory device 208 may also include multiple memory banks such that the video decoder 204 may read multiple pixel lines of the reference picture 242 with time overlap from respective multiple memory banks of each of the first and second memory devices 206, for further minimizing latency.

Consider as an example that each of the first and second memory devices 206 and 208 has four memory banks. FIG. 8 illustrates storage of every four pixel lines of the reference picture 242 into four memory banks A1, A2, A3, and A4, respectively, in the first memory device 206. Similarly, FIG. 9 illustrates storage of every four pixel lines of the reference picture 242 into four memory banks B1, B2, B3, and B4, respectively, in the second memory device 208.

The foregoing is by way of example only and is not intended to be limiting. For example, any number of elements as illustrated and described herein is by way of example. Thus, the present invention may be practiced with use of any number of multiple memory devices for storing pixel lines of the reference picture 242.

The present invention is limited only as defined in the following claims and equivalents thereof.

The invention claimed is:

1. A method of decoding video data, comprising:
storing a first set of pixel lines of a reference picture into a first memory device and storing a second set of pixel lines of the reference picture into a second memory device; and
reading a first portion of a pixel block from the first set of pixel lines in the first memory device and reading a second portion of the pixel block from the second set of pixel lines in the second memory device, for generating a subsequent picture,
wherein a ratio of a first number of pixel lines of the first set to a second number of pixel lines of the second set is proportional to a ratio of a first clock frequency of the first memory device to a second clock frequency of the second memory device,
and wherein the first and second clock frequencies are different such that the first and second number of pixel lines stored in the first and second memory devices are different.

2. The method of claim 1, wherein the readings of the first and second portions of the pixel block overlap in time.

3. The method of claim 1, further comprising:
generating a respective read request to the first or second memory devices for reading from each pixel line in the first or second memory devices.

4. The method of claim 1, wherein reading the first portion of the pixel block includes reading from a first sub-set of pixel lines of the first set, and wherein reading the second portion of the pixel block includes reading from a second sub-set of pixel lines of the second set.

5. The method of claim 1, further comprising:
generating the reference picture comprised of the first and second sets of pixel lines from a video data stream before storing the first and second sets of pixel lines into the first and second memory devices.

6. The method of claim 1, further comprising:
storing each pixel line into a respective bank of one of the first and second memory devices.

7. The method of claim 1, wherein the pixel block is read from the first and second memories in one of a field mode or a frame mode.

8. The method of claim 1, further comprising:
reading a plurality of pixel blocks, each pixel block having a respective first portion read from the first set of pixel lines in the first memory device and having a respective second portion read from the second set of pixel lines in the second memory device; and
processing the plurality of pixel blocks for generating the subsequent picture.

9. The method of claim 1, further comprising:
organizing the pixel lines from the reference picture into the first and second sets by performing the steps of:
dividing the pixel lines from the reference picture into a top field and a bottom field, wherein the top field is comprised of odd pixel lines of the reference picture and the bottom field is comprised of even pixel lines of the reference picture; and
forming the first set stored in the first memory device from odd pixel lines of the top field alternating with even pixel lines of the bottom field, and forming the second set stored in the second memory device from even pixel lines of the top field alternating with odd pixel lines of the bottom field.

10. An apparatus for decoding video data, comprising:
a first memory device;
a second memory device; and
a video decoder including:
a data processor; and
a third memory device having sequences of instructions stored thereon, wherein execution of the sequences of instructions by the data processor causes the data processor to perform the steps of:
storing a first set of pixel lines of a reference picture into a first memory device and storing a second set of pixel lines of the reference picture into a second memory device; and
reading a first portion of a pixel block from the first set of pixel lines in the first memory device and reading a second portion of the pixel block from the second set of pixel lines in the second memory device, for generating a subsequent picture,
wherein a ratio of a first number of pixel lines of the first set to a second number of pixel lines of the second set is proportional to a ratio of a first clock frequency of the first memory device to a second clock frequency of the second memory device,
and wherein the first and second clock frequencies are different such that the first and second number of pixel lines stored in the first and second memory devices are different.

11. The apparatus of claim 10, wherein execution of the sequences of instructions by the data processor causes the data processor to further perform the step of:
generating requests to the first and second memory devices such that the readings of the first and second portions of the pixel block overlap in time.

12. The apparatus of claim 10, wherein execution of the sequences of instructions by the data processor causes the data processor to further perform the step of:
generating a respective read request to the first or second memory devices for reading from each pixel line in the first or second memory devices.

13. The apparatus of claim 10, wherein reading the first portion of the pixel block includes reading from a first sub-set of pixel lines of the first set, and wherein reading the second portion of the pixel block includes reading from a second sub-set of pixel lines of the second set.

14. The apparatus of claim 10, wherein execution of the sequences of instructions by the data processor causes the data processor to further perform the step of:
generating the reference picture comprised of the first and second sets of pixel lines from a video data stream before storing the first and second sets of pixel lines into the first and second memory devices.

15. The apparatus of claim 10, wherein the first and second memory devices store each pixel line into a respective bank of the first and second memory devices.

16. The apparatus of claim 10, wherein the pixel block is read from the first and second memories in one of a field mode or a frame mode.

17. The apparatus of claim 10, wherein execution of the sequences of instructions by the data processor causes the data processor to further perform the steps of:
reading a plurality of pixel blocks, each pixel block having a respective first portion read from the first set of pixel lines in the first memory device and having a respective second portion read from the second set of pixel lines in the second memory device; and
processing the plurality of pixel blocks for generating the subsequent picture.

18. The apparatus of claim 10, wherein execution of the sequences of instructions by the data processor causes the data processor to further perform the step of:

organizing the pixel lines from the reference picture into the first and second sets by performing the steps of:
  dividing the pixel lines from the reference picture into a top field and a bottom field, wherein the top field is comprised of odd pixel lines of the reference picture and the bottom field is comprised of even pixel lines of the reference picture; and
  forming the first set stored in the first memory device from odd pixel lines of the top field alternating with even pixel lines of the bottom field, and forming the second set stored in the second memory device from even pixel lines of the top field alternating with odd pixel lines of the bottom field.

19. A video decoder for decoding video data, comprising:
a data processor; and
a memory device having sequences of instructions stored thereon, wherein execution of the sequences of instructions by the data processor causes the data processor to perform the steps of:
reading a pixel block from a first set of pixel lines in a first memory device and a second set of pixel lines in a second memory device; and
decoding the pixel block for generating a subsequent picture,
  wherein a ratio of a first number of pixel lines of the first set to a second number of pixel lines of the second set is proportional to a ratio of a first clock frequency of the first memory device to a second clock frequency of the second memory device,
  and wherein the first and second clock frequencies are different such that the first and second number of pixel lines stored in the first and second memory devices are different.

20. The video decoder of claim 19, wherein execution of the sequences of instructions by the data processor causes the data processor to further perform the step of:
  generating requests to the first and second memory devices such that the readings from the first and second memory devices overlap in time.

21. The video decoder of claim 19, wherein execution of the sequences of instructions by the data processor causes the data processor to further perform the steps of:
  reading a first portion of the pixel block from a first sub-set of pixel lines of the first set; and
  reading a second portion of the pixel block from a second sub-set of pixel lines of the second set.

* * * * *